US012730648B2

(12) United States Patent
Austin, II et al.

(10) Patent No.: US 12,730,648 B2
(45) Date of Patent: Sep. 8, 2026

(54) MODULAR NETWORK SCAN ORCHESTRATION

(71) Applicant: Wells Fargo Bank, N.A., San Francisco, CA (US)

(72) Inventors: Mark Jonathan Austin, II, Greensboro, NC (US); Asheley Shawn Lee, Collegeville, PA (US); Kelley Arthur, Madison, GA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 282 days.

(21) Appl. No.: 18/450,259

(22) Filed: Aug. 15, 2023

(65) Prior Publication Data

US 2025/0060969 A1 Feb. 20, 2025

(51) Int. Cl.
*G06F 9/38* (2018.01)

(52) U.S. Cl.
CPC .................................. *G06F 9/3867* (2013.01)

(58) Field of Classification Search
CPC ..................................................... G06F 9/3867
See application file for complete search history.

(56) References Cited

U.S. PATENT DOCUMENTS 6,205,552 B1 * 3/2001 Fudge ................. H04L 63/1425 726/25
8,095,961 B1 * 1/2012 Morley ................... H04L 63/20 726/4
8,644,314 B2 * 2/2014 Suri .................... H04L 65/1104 370/392
10,565,372 B1 * 2/2020 Stickle .................... G06F 21/55
10,628,914 B1 * 4/2020 Donais .................... H04L 67/10
10,873,593 B2 * 12/2020 Gandham ........... G06F 9/45558
11,150,895 B1 * 10/2021 Wall .......................... G06F 8/65
11,500,673 B2 * 11/2022 Taher ...................... G06F 9/485
11,698,915 B1 * 7/2023 Yao .................... H04L 41/0813 707/602
12,177,316 B1 * 12/2024 Glozman .............. H04L 67/568
12,204,943 B1 * 1/2025 Yembari ............... G06F 9/3838

(Continued)

FOREIGN PATENT DOCUMENTS

CN 103685279 A * 3/2014
CN 118250255 A * 6/2024 ............. H04L 69/06

(Continued)

OTHER PUBLICATIONS

"15 Best Network Scanning Tools (Network and IP Scanner) of 2023," Software Testing Help, available at https://www.softwaretestinghelp.com/network-scanning-tools/, accessed Aug. 15, 2023.

*Primary Examiner* — James R Sheleheda
(74) *Attorney, Agent, or Firm* — Merchant & Gould P.C.

(57) ABSTRACT

An example of the modular outpost pipeline can make complex branching decisions at stages along the pipeline based on attributes of the data already gathered. This allows modifications to scans in progress within the outpost-based pipeline, and near-real-time sharing of specific scan data to external tools. The logic necessary can be implemented in any outpost pipeline stage but is preferentially accomplished by using secondary orchestrator stages inserted after the pipeline stages where relevant data has been acquired.

16 Claims, 8 Drawing Sheets

(56) References Cited

U.S. PATENT DOCUMENTS

2003/0212779 A1* 11/2003 Boyter ................ H04L 63/1433 709/223
2004/0015728 A1* 1/2004 Cole .................. G02B 6/12011 709/224
2005/0138413 A1* 6/2005 Lippmann ............. G06F 21/577 726/4
2006/0085852 A1* 4/2006 Sima ..................... G06F 21/577 726/22
2008/0183688 A1* 7/2008 Chamdani ........... G06F 16/2453
2009/0038014 A1* 2/2009 Force .................. H04L 63/1433 726/25
2009/0254532 A1* 10/2009 Yang ..................... G06F 16/221
2011/0161965 A1* 6/2011 Im ......................... G06F 9/5038 718/102
2014/0007241 A1* 1/2014 Gula ................... H04L 63/1433 726/25
2014/0165077 A1* 6/2014 Martinez Canedo ... G06F 8/456 718/107
2017/0324768 A1* 11/2017 Crabtree ............. H04L 63/1433
2018/0048521 A1* 2/2018 Nair ........................ H04L 41/22
2018/0191637 A1* 7/2018 Yang ................... H04L 41/0897
2018/0278626 A1* 9/2018 Kraning .................. H04L 67/60
2018/0302500 A1* 10/2018 Zhang ................... G06F 16/951
2018/0368007 A1* 12/2018 Cummings ............. H04L 67/51
2020/0059480 A1* 2/2020 Junod ................. H04L 63/1433
2020/0104171 A1* 4/2020 Theimer ............... G06F 16/183
2020/0104185 A1* 4/2020 Alvelda, VII ......... G06F 9/5066
2021/0014113 A1* 1/2021 Guim Bernat ...... H04L 41/0806
2021/0014133 A1* 1/2021 Maciocco ........... H04L 41/5009
2021/0124611 A1* 4/2021 Saillet ................... G06F 9/4887
2021/0191898 A1* 6/2021 Khan .................. G06F 15/7896
2022/0014418 A1* 1/2022 Gerö ................... H04L 41/0803
2022/0060498 A1* 2/2022 Head, Jr. ............. H04L 12/4641
2022/0255956 A1* 8/2022 Hodgman ........... H04L 63/1433
2023/0060348 A1* 3/2023 Huang .............. H04W 28/0236
2023/0104129 A1* 4/2023 Miriyala ............. H04L 41/0813 709/220
2023/0275909 A1* 8/2023 Shivamoggi ........ H04L 63/1441 726/23
2023/0362056 A1* 11/2023 Lucas ................. H04L 41/0893
2023/0393892 A1* 12/2023 Pasupathi ......... G06F 16/24568
2024/0385888 A1 11/2024 Lee et al.
2025/0060969 A1* 2/2025 Austin, II ............... G06F 9/542
2025/0214614 A1* 7/2025 Urtasun ............... G05D 1/0214
2025/0244988 A1* 7/2025 Waichal .................... G06F 8/65
2025/0247391 A1* 7/2025 Ladelsky Lellouch ...................... H04L 63/0876

FOREIGN PATENT DOCUMENTS

CN 118337520 A * 7/2024 ............. H04L 67/02
RU 2679179 C1 * 2/2019 ............. H04L 63/20
WO WO-2013149174 A1 * 10/2013 ............ H04W 24/02
WO WO-2022061022 A1 * 3/2022 ............... G06N 7/01

* cited by examiner

MODULAR NETWORK SCAN ORCHESTRATION

BACKGROUND

Complex workflows performed on large sets of data require substantial computational resources. Often workflows conduct querying or scanning of multiple locations in a network. Such queries or scans can be completed using a modular outpost system along a so-called pipeline.

Internal scans and enrichments require analysis of large numbers of addresses on a network. Such scans are often made to identify vulnerabilities that may be interesting to bad actors. Therefore, delays or errors in completing the pipeline of scans are a concern.

SUMMARY

In the first aspect, a modular outpost system includes a server and a modular outpost engine. The modular outpost engine includes a primary orchestrator module, a plurality of secondary orchestrator modules, and a plurality of stages. The plurality of secondary orchestrator modules is associated with the plurality of stages and dynamically defines a modular outpost pipeline. A modular outpost pipeline allows for single or branching paths and integration with external systems.

In a second aspect, a method is disclosed that includes assigning a pipeline for a series of scans at a primary orchestrator module. The pipeline can be based upon a static target list of IP addresses, ranges, and Classless Inter-Domain Routings (CIDRs). The method can include scanning targets in a plurality of stages as defined by the pipeline. Additionally, the method can include a hierarchal and modular avoid list used by the primary orchestrator stage of a single or branching pipeline to read and compute what is to be avoided for a given target. The avoid list ensures targets that react adversely to scanning are avoided.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
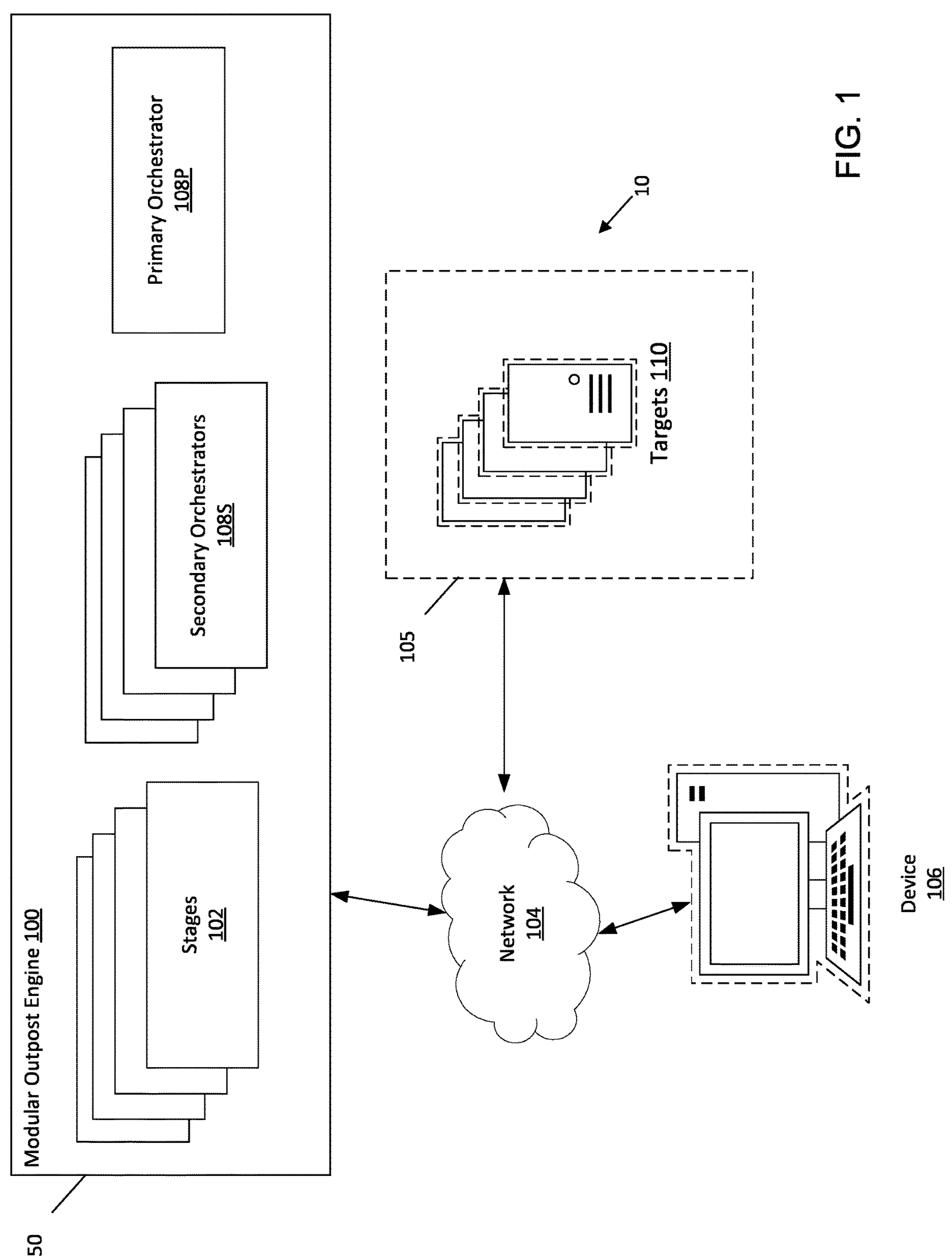
FIG. 1 depicts the modular outpost system components used for carrying out scans on devices and other targets in a network.

Examples provided herein are directed to a modular outpost system that can route messages within a plurality of pipelines for processing a scan or set of scans.

As described herein, a defined pipeline is a configurable workflow for scans that maintains the advantages of pipeline-based workflows described above for scanning large numbers of targets. The defined pipeline configurable workflow is created and updated by an architecture referred to herein as a modular outpost engine.

Logic within an outpost pipeline as described herein uses stages with secondary orchestrators to make complex branching decisions based on attributes of the data already gathered. It is not necessary to wait until the end of the pipeline to adjust the pipeline using such branching decisions, since these features can be implemented at any stage, either primary or secondary. The modular outpost system therefore allows modifications to scans in progress, and near-real-time sharing of specific scan data to external tools. The logic necessary can be implemented in any outpost pipeline stage but is preferentially accomplished by using additional orchestrator stages inserted after the pipeline stages where relevant data has been acquired.

A modular outpost engine is a system in which a simple configuration file is used to control a complex flow of events. Modular outpost engines adjust the flow of events for a pipeline of scans through multiple stages based on instructions from a configuration file.

For example, a configuration file defines the order of stages within a pipeline. This can include Primary Orchestrator, optional Secondary Orchestrator modules, and stages. The Primary Orchestrator module is the entry point into a stand-alone pipeline. The optional Secondary Orchestrator modules receive messages from upstream stages and supplemental discovery data from external systems and uses internal logic to determine how the message is handled.

Unlike a conventional event flow management system, the modular outpost engine described herein uses a task or queue model to configure topics that each stage of the outpost pipeline handles. Such dynamic features of the modular outpost system can be enabled by using inputs from external processes that attach to any stage of the pipeline to consume or produce messages to a queue.

The modular outpost system can either consist of a branching pipeline model, a publisher-subscriber model, or a combination thereof.

In the branching pipeline model, an outpost pipeline stage can duplicate or move a scan, and its data, to a different pipeline. This can be done selectively, based on any attribute in the scan data, or for each message received.

In a publisher-subscriber model, an outpost pipeline stage can publish scan attribute data to external systems. Data sharing can therefore be implemented between any outpost pipeline stage and various external systems without reconfiguration of the outpost pipeline itself.

The publisher-subscriber model can also deliver custom scan data to external systems based on any condition available in the scan data. Such delivery can be customized as needed based on the design and purpose of the outpost pipeline system and the requirements of the external systems.

These concepts will now be described in more detail with respect to the specific embodiments and examples that are depicted in FIGS. 1-8.

FIG. 1 is the modular outpost system 10 including a computing device 50 with a modular outpost engine 100. The modular outpost engine 100 includes a series of stages 102 that are associated with various tasks that might be carried out in a pipeline or workflow. As will become clear from the description below, in other embodiments the modular outpost engine 100 can be implemented across multiple devices. For example, secondary orchestrators 108S can be implemented on a different device 50 than the Primary Orchestrator 108P.

Stages 102 receives a message from a pipeline and performs a discrete set of actions, typically a scan, and then outputs a message back to the pipeline.

Network 104 can connect modular outpost engine 100 with one or more devices 106 that are usable by an operator to set or modify the pipeline or workflow, or to define rules by which the other components (such as the Primary Orchestrator 108P and Secondary Orchestrators 108S described below) modify the pipeline. Devices 106 can be used to monitor and update input data, such as the Avoid List as described in more detail in FIG. 7.

The Primary Orchestrator 108P inserts messages into the pipeline from an input source. The Secondary Orchestrators 108S are an optional stage that implement logic within the pipeline. A pipeline configuration sets the pipeline. Primary Orchestrator 108P adds scan targets to the pipeline from target lists. The Secondary Orchestrators 108S are functional logic inserted into the pipeline as a stage. Secondary Orchestrators 108S can monitor for messages as they flow through a pipeline and can drop, move, or reroute messages, and announce data to subscribers, for example.

Modular outpost engine 100 includes a Primary Orchestrator 108P and a set of Secondary Orchestrators 108S. Typically, primary orchestrator 108P will be set based on rules that are entered via devices 106. The Primary Orchestrator 108P as shown in FIGS. 2-6 is the first stage of a default outpost pipeline. The Primary Orchestrator 108P feeds the pipeline using a static Target List of IP addresses, ranges, and Classless Inter-Domain Routings (CIDRs). The Primary Orchestrator 108P ensures static targets are recycled at configurable intervals and randomizes target 110 addresses so that specific scans requiring specific stages of processing are not called all together with one another. The targets 110 can be arranged in a Target List that is called in a randomized fashion to minimize impact to bandwidth within contiguous network segments, minimize load on network devices, and reduce false alarms in Intrusion Detection systems. The primary orchestrator can also prevent unwanted scans by utilizing the Avoid Module to retrieve relevant Avoid Lists and attach to static targets.

Secondary Orchestrators 108S are placed after initial brute-force stages used for basic endpoint discovery in the pipeline. Secondary Orchestrators 108S add reactive scan capabilities by incorporating enrichment data and new endpoint discoveries received from other outpost pipelines or external tools. Secondary Orchestrators 108S can direct any type of scan, such as port scanning or scanning for particular types of vulnerabilities that affect particular types of machines. Secondary Orchestrators 108S prevent over-scanning by validating endpoint eligibility based on presence on an eligible list, time of last scan compared to configurable backoff values, and conditional overrides based on enrichment data, in various embodiments. Secondary Orchestrators 108S can use an Avoid Module to retrieve relevant Avoid Lists and attach them to new supplementary targets.

Unlike a conventional system, Primary Orchestrator 108P and Secondary Orchestrator 108S are used in combination to update the pipeline of targets 110 through stages 102 for scanning. Some examples of ways in which targets 110 can be routed for scanning via the stages 102 is described in more detail with respect to FIGS. 2-6. These potential routes are adjusted to follow the path set by the Primary Orchestrator 108P, as adjusted by the Secondary Orchestrators 108S. In some embodiments, there can be integrated external components as well that facilitate more efficient arrangement of the stages 102 in a work pipeline.

Figure 2:
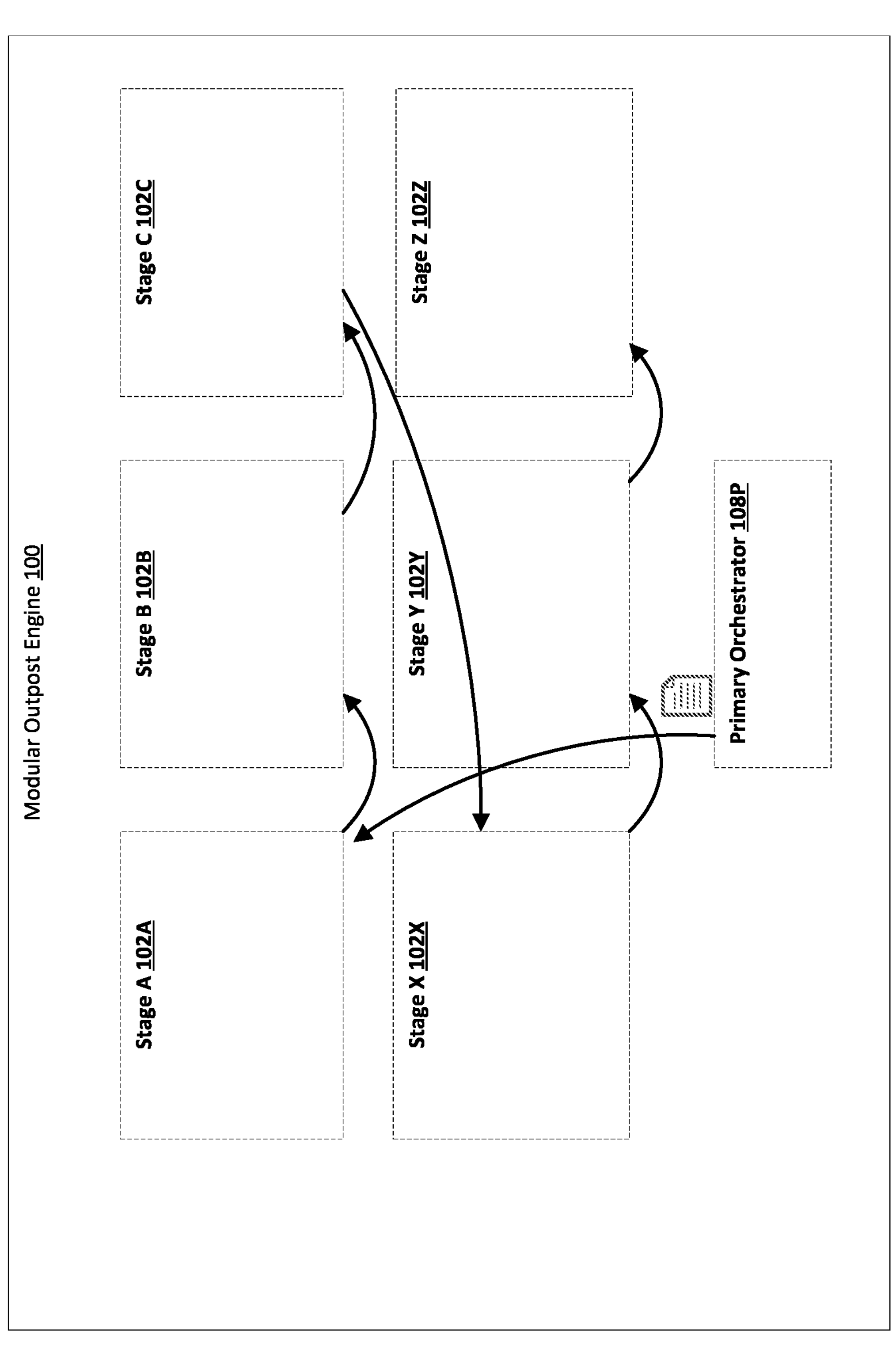
FIG. 2 illustrates a modular outpost pipeline and a series of stages of the modular outpost engine of FIG. 1, according to a path described by the pipeline configuration.

FIG. 2 shows modular outpost engine 100 of FIG. 1, used to carry out a workflow through a linear pipeline. In the embodiment shown in FIG. 1, a Primary Orchestrator 108P generates an initial scan pipeline (indicated with a file icon) through each of six stages (102A, 102B, 102C, 102X, 102Y, and 102Z). As noted above, there can be any number of stages available within a modular outpost engine 100, and six are shown here only for purposes of illustration.

The Primary Orchestrator 108P can set a workflow pipeline that causes the stages 102 of scans to be completed in order—that is, in the arrangement shown in FIG. 2, from left to right and top to bottom.

Figure 3:
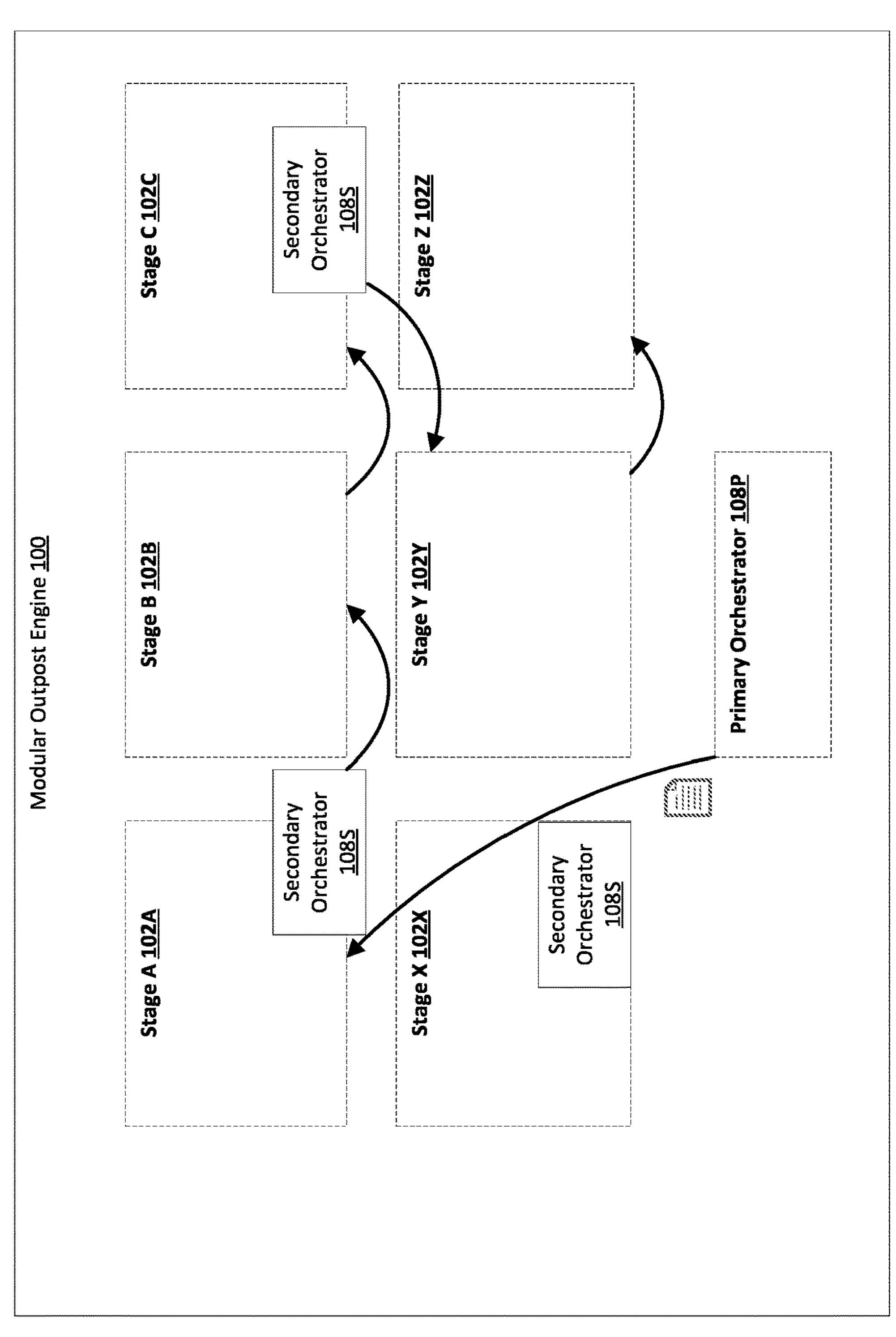
FIG. 3 illustrates a modular outpost pipeline through a series of stages of the modular outpost engine of FIG. 1, according to a path determined by both the primary orchestrator and a plurality of secondary orchestrators thereof.

FIG. 3 shows the same elements as FIG. 2, except that it further illustrates the addition of Secondary Orchestrators 108S distributed at stages 102A, 102C, and 102X.

As shown in FIG. 3, not all stages 102A-102Z need be associated with a Secondary Orchestrator 108S. However, where present, the Secondary Orchestrators are capable of modifying the original pipeline workflow set by the Primary Orchestrator 108P. In FIG. 3, the Primary Orchestrator 108P sets the same original pipeline as that shown in FIG. 2. That is, the initial pipeline (indicated by the file icon) is routed by the Primary Orchestrator 108P from left to right and top to bottom in order: stage A (102A), stage B (102B), stage C (102C), stage X (102X), stage Y (102Y), and stage Z (102Z). However, the pipeline need not include all these stages if it is modified based on information obtained during a scan, as communicated in messages from one or more of the Secondary Orchestrators 108S, as described in more detail below.

Specifically, in FIG. 3 the Secondary Orchestrator 108S associated with stage C (102C) determines that the scan associated with stage X (102X) should not be the next stage to be performed, and therefore the pipeline does not include stage X (102X) but instead proceeds directly to stage Y (102Y).

Skipping stage X (102X) could occur for any of a number of reasons. Secondary Orchestrator 108S of stage C (102C) could, for example, determine that the scan associated with stage X (102X) will cause an error, either due to the target being processed or due to constraints of stage X (102X) itself. Alternatively, Secondary Orchestrator 108S of stage C (102C) could determine that the Primary Orchestrator 108P improperly identified the targets 110 for scanning and that those targets 110 would be inappropriate for scanning at stage X (102X). By identifying this, Secondary Orchestrator 108S of stage C (102C) avoids potential errors or wasted computational resources that would otherwise have occurred had the pipeline set by the Primary Orchestrator 108P been followed without modification.

As described previously, in some embodiments a message can be generated that is passed between the orchestrators 108P and 108S and can include accompanying information that specifies the pipeline route. Stage X (102X) could therefore be removed from the pipeline by any preceding Secondary Orchestrator 108S. For example, it could be that the secondary orchestrator 108S associated with stage A (102A) removed the portion of the pipeline that passes through stage X (102X) before the pipeline proceeds to stage B (102B). Alternatively, it could be the case that the Secondary Orchestrator 108S associated with stage C (102C) was the Secondary Orchestrator that removed the stage X (102X) from the pipeline. In either case, the pipeline proceeds from stage C (102C) to stage Y (102Y) directly, without calling stage X (102X).

The inclusion of secondary orchestrators 108S in the modular outpost engine 100 therefore results in efficiency improvements, as following the pipeline of stages shown in FIG. 3 requires fewer processing steps than the pipeline shown in FIG. 2.

Although not shown in FIG. 3, it should also be appreciated that in some circumstances Secondary Orchestrators 108S can make decisions about how to route a message. Secondary Orchestrators 108S can send messages for future Secondary Orchestrators 108S and stages 102 to use regarding scans. Additionally, Secondary Orchestrators 108S can incorporate enrichment data and new endpoint discoveries received from other outpost pipeline or external systems.

Figure 4:
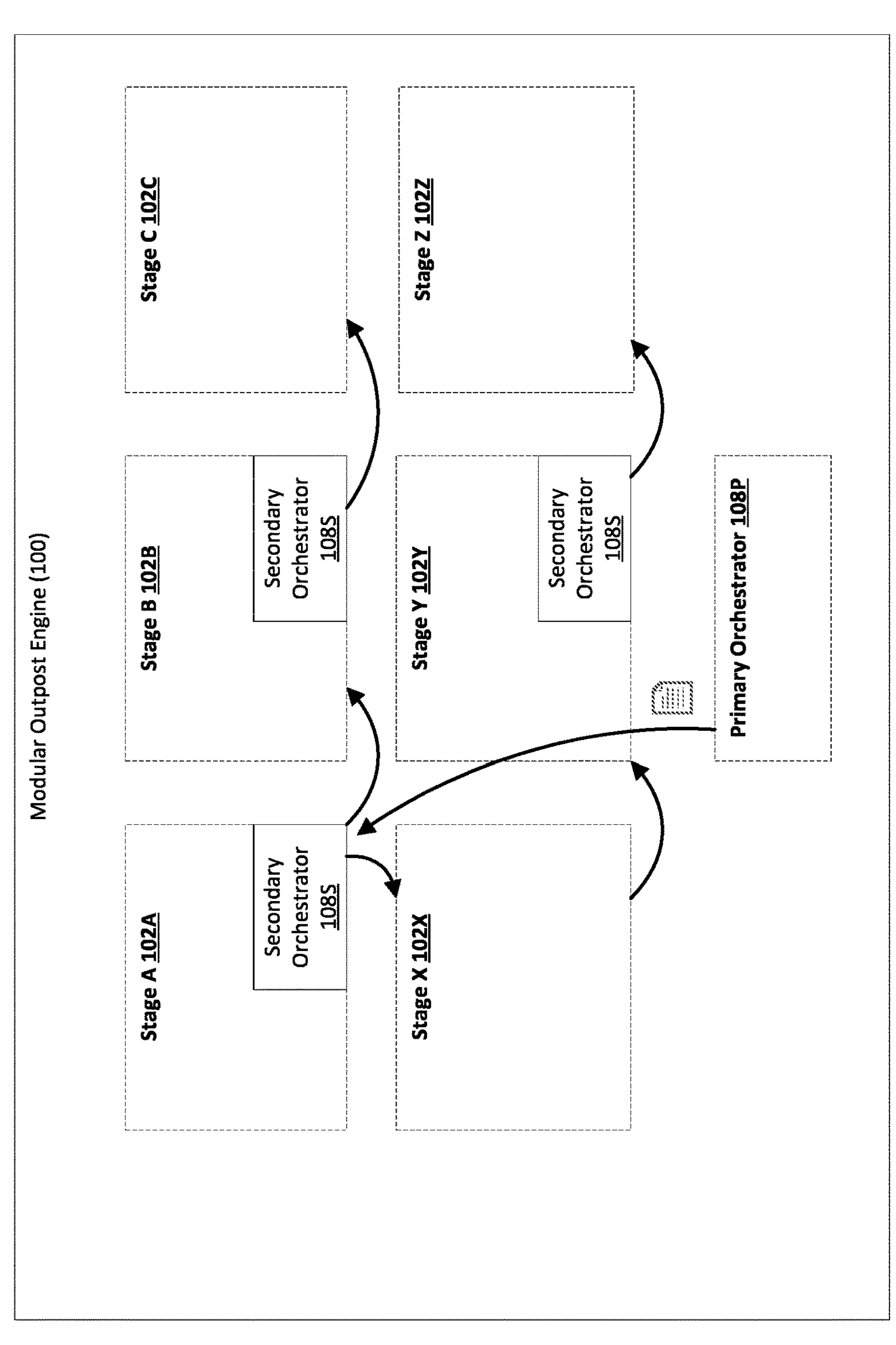
FIG. 4 illustrates a modular outpost pipeline through a series of stages of the modular outpost engine of FIG. 1, according to a branching path determined by both the primary orchestrator and a plurality of secondary orchestrators thereof.

FIG. 4 shows a branching pipeline model implemented by the modular outpost engine 100. In FIG. 4, the primary orchestrator 108P again sets an initial pipeline for progression through stage A (102A), stage B (102B), stage C (102C), stage X (102X), stage Y (102Y), and stage Z (102Z). As the message (indicated by the file icon) sent by the secondary orchestrators 108S, progresses through the stages 102(A-X), secondary orchestrators (108S) can branch the pipeline and send or drop messages relevant to handling the scans, as described above with respect to FIG. 3.

In particular, in the embodiment shown in FIG. 4, secondary orchestrator 108S changes the pipeline after stage A (102A) to progress to conduct scans at stage B (102B) and stage X (102X). Stages B and X (102B and 102X) can therefore conduct scans simultaneously, rather than operating sequentially as set out in the original pipeline set by primary orchestrator 108P (and as shown in FIG. 2).

The branching pipeline model shown in FIG. 4 can adjust the pipeline in near-real time based on information known about targets that have been scanned, or about available resources. Additionally, a branching pipeline model can duplicate or move a scan, and its data to a different pipeline. This can be done selectively, based on any attribute in the scan data, for each message received.

As discussed above, some scanning stages 102 may be prerequisites for others. For example, stage A (102A) may be a prerequisite for stages B, C, and X (102B, 102C, and 102X). Stage X may be a prerequisite for stages Y and Z (102Y and 102Z). The Secondary Orchestrator 108S may recognize, at stage A, that the fastest way to complete the pipeline is therefore to create two or more branches of the pipeline (i.e., a "top line" and a "bottom line" branch, with respect to the arrangement of stages as shown in FIG. 4) for processing.

Figure 5:
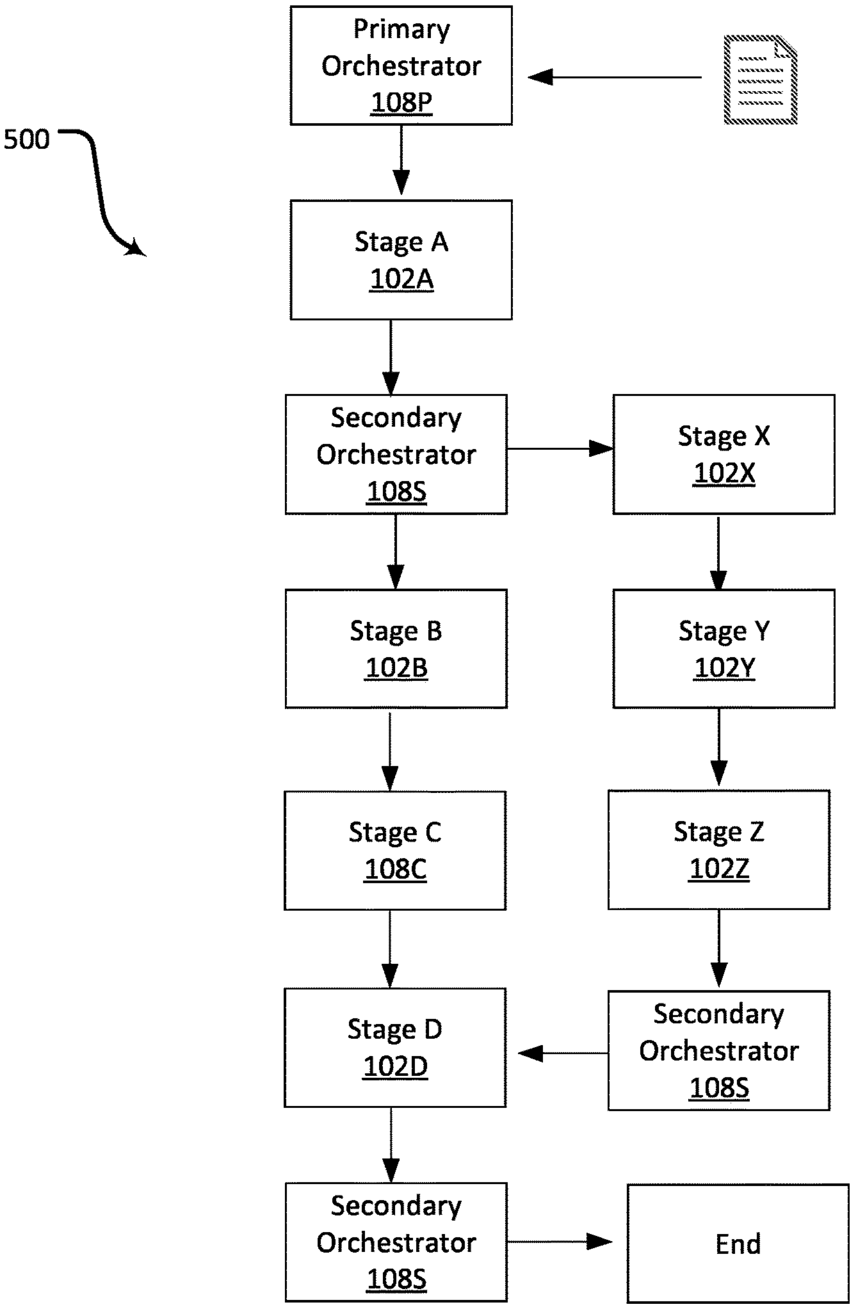
FIG. 5 illustrates a flowchart of a modular outpost pipeline having a complex branching path determined by the primary orchestrator and a plurality of secondary orchestrators thereof.

FIG. 5 shows a flowchart for a branching pipeline model with additional orchestrator stages, according to an embodiment. The branching pipeline model shown in FIG. 5 is different than the one shown in FIG. 4 in two ways: the branches recombine, and the order of stages is different.

As shown in FIG. 5, the Primary Orchestrator 108P sets an initial pipeline for scanning, (indicated by the file icon). First, the pipeline directs that scanning be conducted at stage A (102A). At the end of stage A (102A), a Secondary Orchestrator 108S can redirect messages related to scan targets to an alternate pipeline, based on factors in the message contents or the state of the pipeline. The Secondary Orchestrator (108S) can choose to forward a message along the original pipeline to stage B (102B), or it may copy or forward the message to the branch pipeline's stage X (102X).

After branching, a message proceeds within the pipeline assigned by Secondary Orchestrator (108S). Optionally, a message may be reconverged with the original pipeline. An example is show in FIG. 5, where a message sent from stage Z (102Z) to Secondary Orchestrator (108S) may be reconverged with original pipeline at stage D (102D), after skipping stages B and C (102B and 102C).

Figure 6:
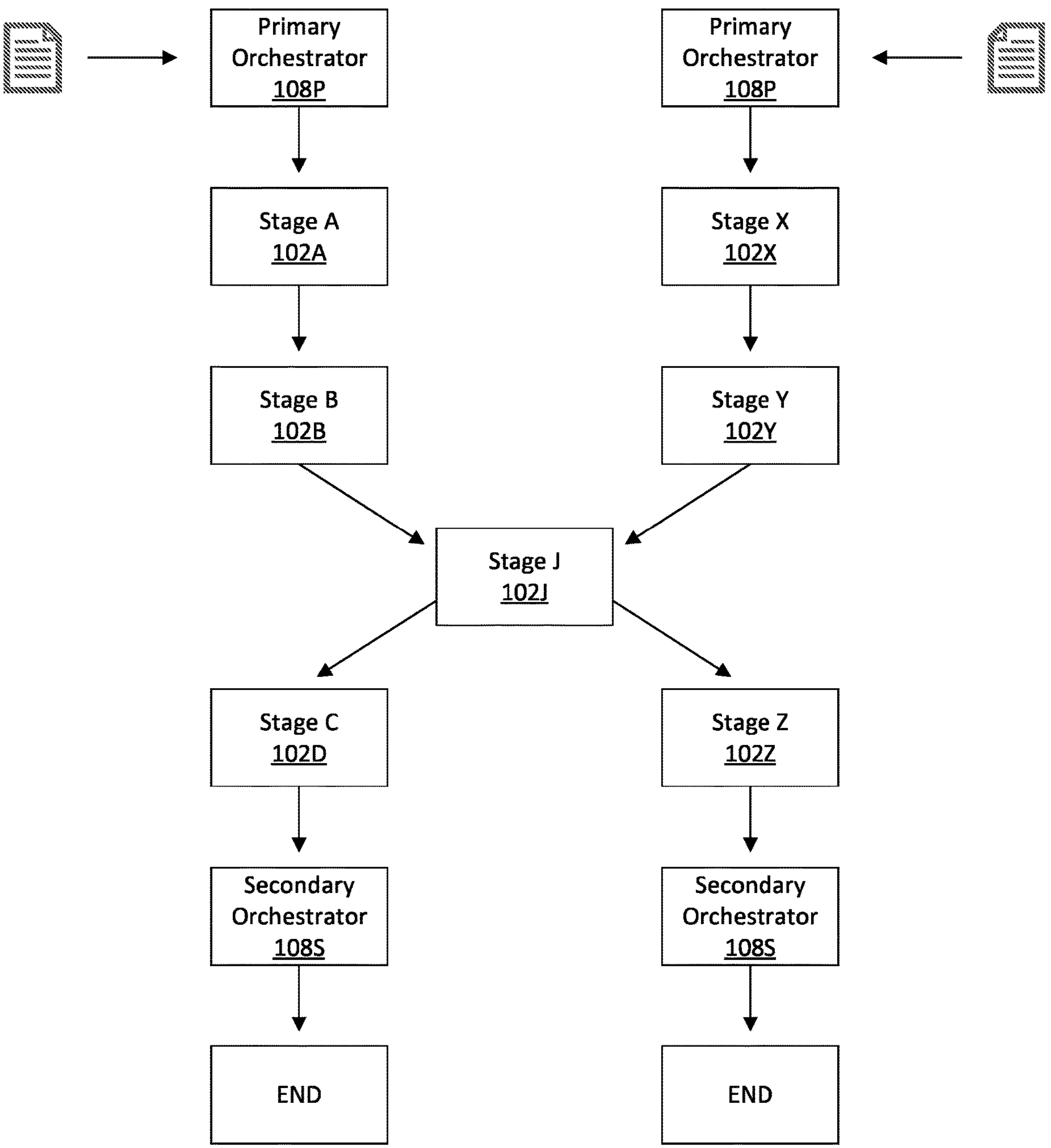
FIG. 6 illustrates a flowchart of two independent modular outpost pipelines that share a stage without requiring a Secondary Orchestrator.

FIG. 6 shows two independent pipelines that are sharing stage J (102J). Reusing stages in multiple pipelines saves resources that would be wasted if each pipeline required their own independent copies of otherwise identical stages.

In FIG. 6, messages may enter stage J (102J) from either stage B or Y (102B or 102Y). Stage J (102J) will track the originating pipeline of incoming messages. When stage J (102J) is ready to forward a message to the next stage, the message will be automatically forwarded to stage C or Z (102C or 102Z) based on the originating pipeline of the message.

Logic within each outpost pipeline stage can make complex branching decisions based on attributes of the data already gathered. It is not necessary to wait until the end of the pipeline since these features can be implemented at any stage 102. This allows modifications to in-progress scans by rerouting messages within the pipeline, and near-real-time sharing of scan data to external tools. The logic necessary can be implemented in any secondary orchestrator or stage but is preferentially accomplished by using additional Secondary Orchestrator stages inserted after the pipeline stages where relevant data has been acquired.

Publisher/Subscriber models can be used to publish scan attribute data available to external tools. Data from each stage can be delivered to other systems and customized based on any condition recognized by the stages or by the secondary orchestrators. Each stage 102 can publish information to subscribers using attributes from data corresponding to the scan that is conducted at that stage. This can take place at any point within the outpost pipeline, such as at a Secondary Orchestrator 108S.

An outpost stage 102 or orchestrator 108 may publish specific attributes from scan results to hierarchical topics. Subscribers to those topics receive messages relevant to their subscription without direct interaction with the outpost itself.

For example: A topic about scanned ports could include: [ipv4|ipv6].[tcp/udp].ports.[open|closed|stealth]0.0-65535

A subscriber could receive all messages related to ports by subscribing to the "#.ports" topic using a wildcard or subscribe to "ipv4.#.open" to receive messages about all open IPv4 ports. If the subscriber only cares about a single port, they could subscribe to "#.open.445" to only receive messages about devices found to have port 445 open.

Custom orchestrators 108 can be created from modular base classes which handle the complexity of interacting with multiple pipelines. Rapid deployment of new or custom capabilities only requires the addition of logic to make decisions about where to move scan states or data. Outpost pipelines as described herein can contain as many or as few Secondary Orchestrators 108S as needed, but an outpost pipeline for default scanning includes at minimum a Primary Orchestrator 108P and a Secondary Orchestrator (108S) stage for control and enrichment of scans.

Avoid Lists are essential to the operation of any bulk scanning tool. Within a large enough population, it is inevitable that the scan tool will encounter devices that react adversely to being scanned. An Avoid List can provide wholesale avoidance of a given target or stage. Alternatively or additionally, the Avoid List can provide selective avoidance of some stages. Alternatively or additionally, the Avoid List can allow for configuration of a single address. Alternatively or additionally, the Avoid List can allow configuration of multiple addresses, such as using Classless Inter-Domain Routing (CIDR) notation. In some embodiments, the Avoid List remains modular, such that adding new stages 102 does not require changing the orchestrators 108 or existing stages 102 in the pipeline. Alternatively or additionally, the Avoid List can prevent misconfiguration or reconfiguration from impacting the ability to use the Avoid List.

To accomplish these objectives, an Avoid module can be used that provides a user-interface (such as at user device 106 of FIG. 1) that defines a simple, high-level syntax for storing Avoid information of a given IP address or CIDR and avoided stages.

In some embodiments, the Avoid module does not define how individual stages store their relevant Avoid List. This allows each stage to define its own Avoid sub-syntax. The Avoid Module defines an Avoid Protocol with various delegate methods that each stage 102 must implement to work with the Avoid module. For example, the Avoid Module routes a string using the stage's avoid sub-syntax to the delegate stage which, parses it and returns an object that can be passed back to that stage as the avoid configuration for an individual target IP. The Avoid Protocol must take a list of avoid strings for the stage, combine them, and return a composite of the list. The Avoid Protocol must return a string with help text and example syntax for the stage's sub-syntax.

Figure 7:
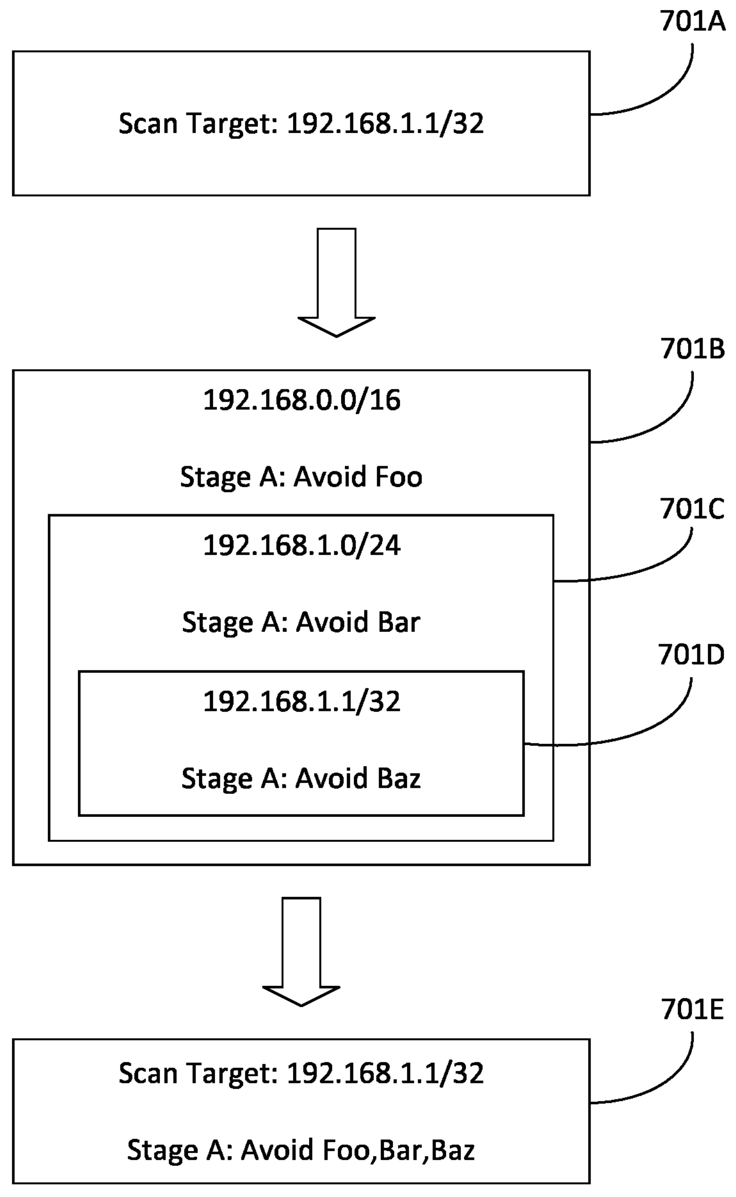
FIG. 7 depicts the hierarchical Avoid Module combining avoid list entries for a single target IP.

FIG. 7 depicts how the Avoid Module compiles multiple entries within the Avoid List (701B, 701C, and 701D) for a target address (701A). The Avoid List may contain multiple matching entries (701B, 701C, and 701D) for a given target address (701A). These are merged using the appropriate delegate methods of the relevant stage, which results in the final composite avoid entry (701E) for the target address.

The primary orchestrator 108P of a single or branching pipeline uses the Avoid module to read and compute what is to be avoided for a given target. When loaded, the Avoid Module reads the Avoid List, storing the list organized by IP and CIDRs. When the Orchestrator selects an IP address to place in the pipeline, the Avoid module can conduct a covering search for the target IP against the avoided IPs and CIDRs. This search returns any nodes that either exactly match that IP or are CIDRs which enclose the IP. The nodes' Avoid Lists are checked for a bare wildcard that would indicate the IP and CIDRs should be entirely avoided. If not entirely avoided, the Avoid module subdivides each node's Avoid List by stage. A subdivided Avoid List is passed to a delegate method within the correct stage 102 to merge the relevant Avoid List entries, as defined by the Avoid Protocol. The Avoid Module takes the merged Avoid List entries from each stage, which are subsequently attached to the target message and placed on the pipeline.

Figure 8:
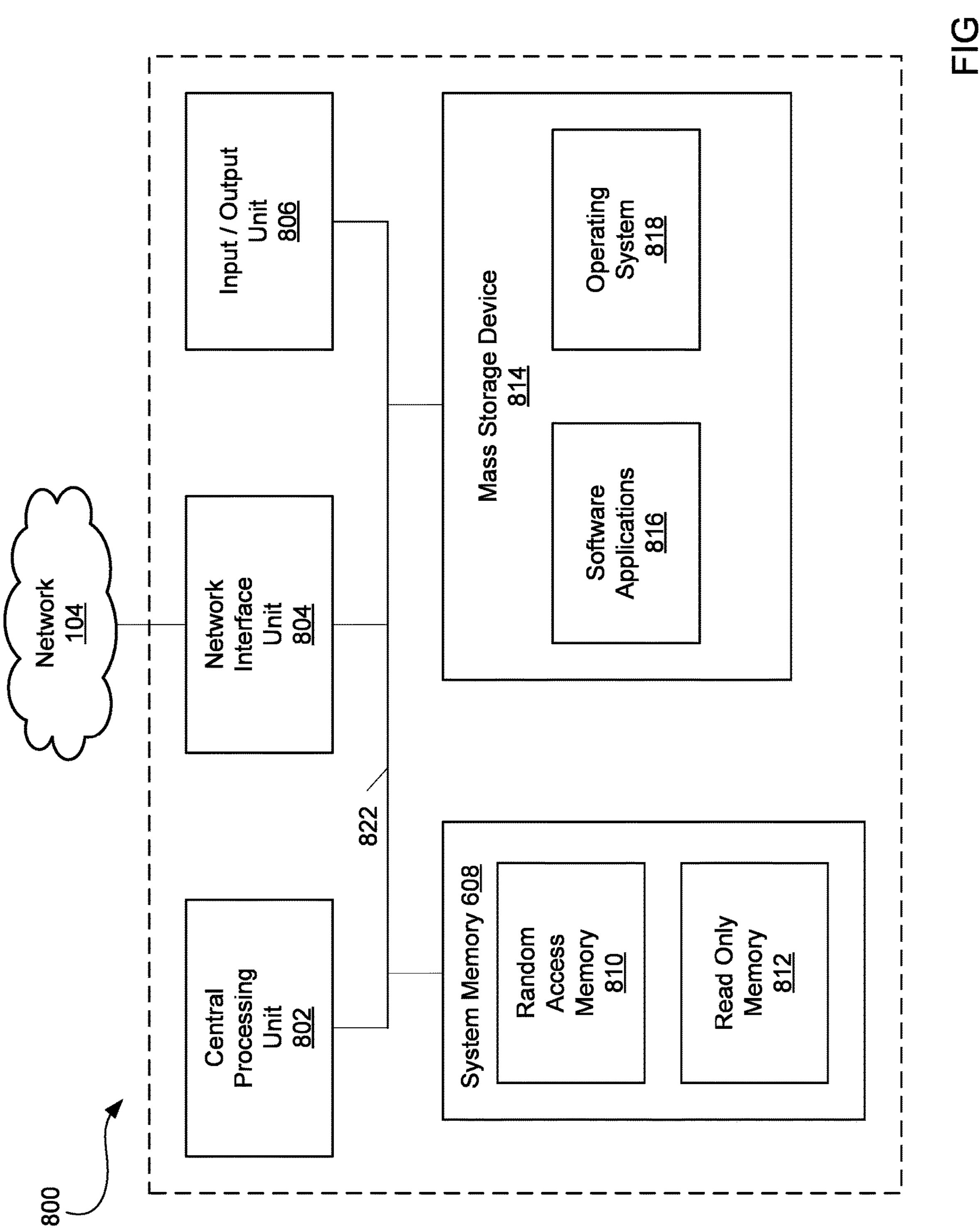
FIG. 8 depicts an example block diagram of a virtual or physical computing system.

FIG. 8 illustrates an example block diagram of a virtual or physical computing system 800. One or more aspects of the computing system 800 can be used as the structures that are described herein in FIGS. 1-7. For instance, the modular outpost engine 100 of FIGS. 1-7 can include one or more of the components of the example computing system 800 described below. The remaining computing devices described herein can be similarly configured.

In the embodiment shown, the computing system 800 includes one or more processors 802, a system memory 808, and a system bus 822 that couples the system memory 808 to the one or more processors 802. The system memory 808 includes RAM (Random Access Memory) 810 and ROM (Read-Only Memory) 812. A basic input/output system that contains the basic routines that help to transfer information between elements within the computing system 800, such as during startup, is stored in the ROM 812. The computing system 800 further includes a mass storage device 814, corresponding to the non-volatile memory as described elsewhere in the application. The mass storage device 814 is able to store software instructions and data. The one or more processors 802 can be one or more central processing units or other processors.

The mass storage device 814 is connected to the one or more processors 802 through a mass storage controller (not shown) connected to the system bus 822. The mass storage device 814 and its associated computer-readable data storage media provide non-volatile, non-transitory storage for the computing system 800. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 800.

According to various embodiments of the invention, the computing system 800 may operate in a networked environment using logical connections to remote network devices through the network 104 depicted in FIG. 1. The network 104 is a computer network, such as an enterprise intranet and/or the Internet. The network 104 can include a LAN, a Wide Area Network (WAN), the Internet, wireless transmission mediums, wired transmission mediums, other networks, and combinations thereof. The computing system 800 may connect to the network 104 through a network interface unit 804 connected to the system bus 822. It should be appreciated that the network interface unit 804 may also be utilized to connect to other types of networks and remote computing systems. The computing system 800 also includes an input/output controller 806 for receiving and processing input from a number of other devices, including a touch user interface display screen, or another type of input device. Similarly, the input/output controller 806 may provide output to a touch user interface display screen or other type of output device.

As mentioned briefly above, the mass storage device 814 and the RAM 810 of the computing system 800 can store software instructions and data. The software instructions include an operating system 818 suitable for controlling the operation of the computing system 800. The mass storage device 814 and/or the RAM 810 also store software instructions, that when executed by the one or more processors 802, cause one or more of the systems, devices, or components described herein to provide functionality described herein. For example, the mass storage device 814 and/or the RAM 810 can store software instructions that, when executed by the one or more processors 802, cause the computing system 800 to receive and execute managing network access control and build system processes.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For example, while certain technologies described herein were primarily described in the context of queueing structures, technologies disclosed herein are applicable to data structures generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A modular outpost system comprising:

a server; and a memory with instructions which, when executed by a processor, cause the system to create a modular outpost engine having:

a primary orchestrator module configured to generate an initial pipeline for a scan or set of scans, wherein the initial pipeline is based upon a static target list of addresses;

a plurality of secondary orchestrator modules;

a plurality of scan stages; and an avoid list that is used by the primary orchestrator module to avoid certain target addresses during network scanning, wherein the avoid list is hierarchical such that multiple avoid list entries for a single target address are combined to create a composite avoid entry;

wherein the primary orchestrator module is configured to randomize addresses across the static target list to minimize impact to bandwidth within contiguous network segments, minimize load on network devices, and reduce false alarms in Intrusion Detection systems;

wherein the primary orchestrator module conducts a covering search for a target address in the static target list against the avoid list that returns nodes that cover the target address;

wherein avoid list entries from the returned nodes are subdivided by scan stage and merged through delegation; and wherein the plurality of secondary orchestrator modules is associated with the plurality of scan stages and dynamically defines a modular outpost pipeline.

2. The modular outpost system of claim 1, wherein the initial pipeline is further based upon one or more of the group consisting of: ranges and Classless Inter-Domain Routing-formatted addresses.

3. The modular outpost system of claim 1, wherein the modular outpost pipeline is a single pipeline.

4. The modular outpost system of claim 1, wherein the modular outpost pipeline is a branching pipeline.

5. The modular outpost system of claim 1, wherein at least some of the plurality of secondary orchestrator modules and the plurality of scan stages are configured to publish specific attributes from scan results of hierarchical topics.

6. The modular outpost system of claim 5, wherein at least some of the plurality of secondary orchestrator modules and the plurality of scan stages are subscribers to the specific attributes from the scan results of hierarchical topics.

7. The modular outpost system of claim 1, further comprising a user device coupled to the server and the modular outpost engine via a network.

8. The modular outpost system of claim 7, wherein the user device is usable by an operator to set or modify the modular outpost pipeline.

9. The modular outpost system of claim 1, wherein the avoid list comprises a list of targets that react adversely to being scanned and can be configured to require wholesale avoidance of a given target or stage, selective avoidance of some stages, configuration of a single address, or configuration of multiple addresses.

10. The modular outpost system of claim 9, wherein the avoid list is modular such that adding new stages to the plurality of scan stages does not require changes to the primary orchestrator module, the plurality of secondary orchestrator modules, or existing ones of the plurality of scan stages.

11. A method comprising:

assigning a pipeline for scanning a plurality of targets at a primary orchestrator module based upon a static target list of IP addresses;

generating an avoid list that is used by the primary orchestrator module to avoid certain target addresses during network scanning, wherein the avoid list is hierarchical such that multiple avoid list entries for a single target address are combined to create a composite avoid entry;

scanning the plurality of targets at a plurality of stages as defined by the pipeline, wherein the primary orchestrator module is configured to randomize addresses across the static target list to minimize impact to bandwidth within contiguous network segments, minimize load on network devices, and reduce false alarms in Intrusion Detection systems, wherein the primary orchestrator module conducts a covering search for a target address in the static target list against the avoid list that returns nodes that cover the target address, and wherein avoid list entries from the returned nodes are subdivided by scan stage and merged through delegation; and modifying the pipeline at one of a plurality of secondary orchestrator modules.

12. The method of claim 11, wherein modifying the pipeline comprises updating a single pipeline.

13. The method of claim 11, wherein modifying the pipeline comprises updating a branching pipeline.

14. The method of claim 11, further comprising:

publishing, by at least some of the plurality of secondary orchestrator modules and the plurality of stages, specific attributes from scan results of hierarchical topics; and obtaining the specific attributes from the scan results of hierarchical topics by others of the plurality of secondary orchestrator modules and the plurality of stages.

15. The method of claim 11, wherein the avoid list comprises a list of targets that react adversely to being scanned and can be configured to require wholesale avoidance of a given target or stage, selective avoidance of some stages, configuration of a single address, or configuration of multiple addresses.

16. The method of claim 11, wherein the avoid list is modular such that adding new stages to the plurality of stages does not require changes to the primary orchestrator module, the plurality of secondary orchestrator modules, or existing ones of the plurality of stages.

* * * * *